3,573,929
VEGETABLE EXTRACT PRODUCTION

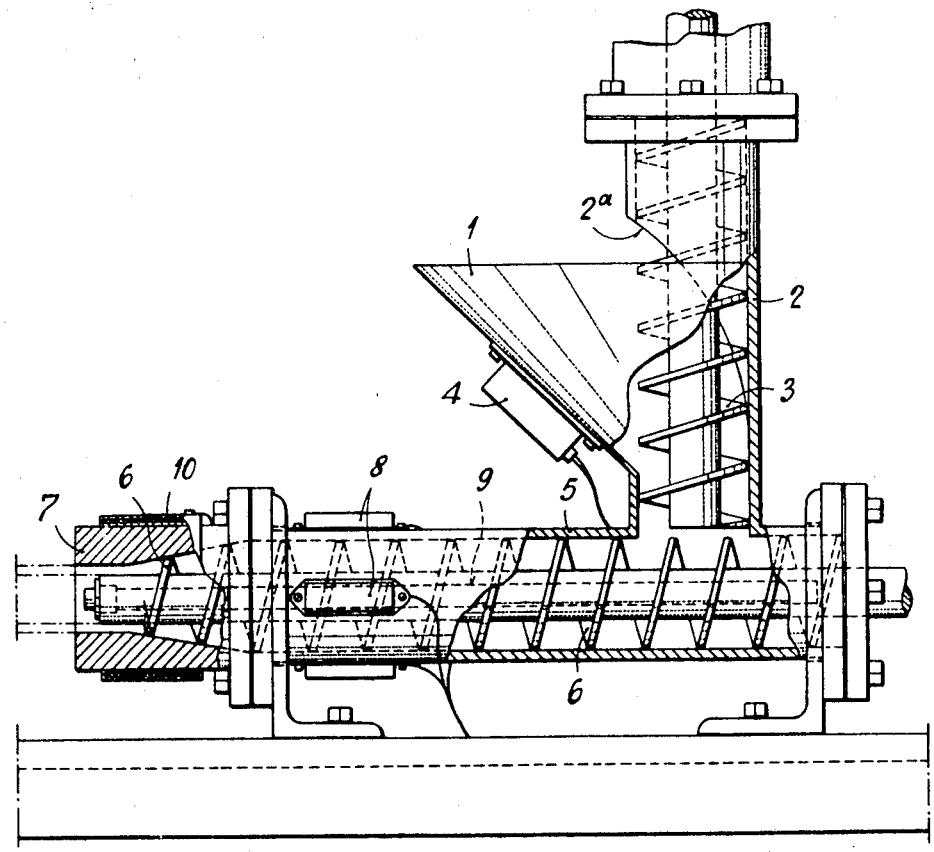

James Leroy Anderson, Marysville, Ohio, Joachim Artur Gaedtke, Wiesbaden, Germany, and Abraham Rudolph Mishkin, Marysville, Ohio, assignors to Societe d'Assistance Technique Pour Produits Nestles S.A., Lausanne, Switzerland
Filed Mar. 26, 1968, Ser. No. 716,060
Claims priority, application Switzerland, Apr. 14, 1967, 5,328/67; Feb. 27, 1968, 2,837/68
Int. Cl. A23f 1/08, 3/02
U.S. Cl. 99—71                                  13 Claims

ABSTRACT OF THE DISCLOSURE

In a freeze-drying process for tea or coffee extract the fines produced by grinding the frozen extract are compressed to a solid while remaining frozen and the solid is reground. The fines may be compressed in a continuous extruder or a tablet press.

---

The present invention concerns the production of extracts from vegetable materials, and especially freeze-dried tea or coffee extracts.

Different methods are known which comprise, after the aqueous extraction of soluble solids from vegetable material such as coffee or tea, the steps of freezing the aqueous extract until solidification of the mass, grinding the frozen extract and drying the extract by sublimation. The grinding of the frozen extract is generally followed by sieving which eliminates the particles which are greater and smaller than the required size.

This particle size is particularly important in the preparation of coffee extracts, in which the grinding gives the dry extract the appearance of roast and ground coffee. It is hence desirable to choose a particle size used by coffee roasters, i.e. from about 0.3 to 2.0 mm.

Screening also allows the fine product particles produced by the mill to be separated since those particles less than 0.2 to 0.4 mm. in size, have a deleterious effect both on the drying process and on quality of the dried product. Thus a dry extract having a proportion of these fine particles greater than 3 to 5% does not have the appearance of roast and ground coffee, since the grinding of coffee beans produces few fine particles and it is furthermore well known that the smaller the particles, the lighter in colour they appear. Likewise, it is known that fine particles tend to stick to the walls of glass jars so that, after the jar has been repeatedly shaken, e.g. during transport, the product when seen from the outside appears to consist mainly of fine powder.

The fine particles also lead to difficulties during drying.

In classical batch freeze-drying processes, the frozen and subdivided extract is distributed on trays, in layers of 1 to 5 cm. thickness for example, and the trays are held in the drying chamber until a dry product is obtained. To obtain rapid sublimation of the ice it is essential that the particles are not too small so as to leave empty space for the passage of the sublimed vapours. It is known that fine particles tend to block these spaces and disturb the drying process, even to the extent of causing the partial melting of the product. Furthermore, because of their low weight, some of the fine particles are carried over by the sublimation vapours towards the condensers, which results in appreciable losses of product. There are thus numerous reasons for eliminating the fine particles separated by the screening.

Frozen aqueous tea or coffee extracts are friable materials and grinding produces, as with most crystalline materials, a relatively high proportion of fine particles, which is generally from 20 to 30% by weight of the initial product. It is therefore necessary to recycle the fines and two general methods will be obvious to one skilled in the art. The first consists of adding the fine frozen particles to the mass of extract at the start of freezing. When applied to a large amount of product requiring recycling, the use of this solution industrially presents serious equipment problems. Alternatively, the fine frozen particles may be melted, and the melted product mixed with the liquid extract before freezing. This method, very simple to carry out, involves a considerable economic loss because of the energy used to re-freeze the particles.

It is an object of the present invention to provide a method and apparatus for drying vegetable extracts which tend to overcome these disadvantages.

According to the invention, there is provided a process for preparing dry tea and coffee extracts, comprising solidifying an aqueous tea or coffee extract by freezing, grinding the frozen extract and separating two fractions of ground material, freeze-drying one of said fractions, compressing the second fraction at low temperature to provide a homogeneous solid, subdividing said solid and freeze-drying at least a part of said subdivided solid.

Preferably the particle fraction which is compressed comprises the undesired fine particles, which in the case of coffee are those which pass through a sieve of 0.2 to 0.4 mm. aperture. Preferably, the particles are compressed continuously into a solid such as a ribbon or tube which is subsequently subdivided. After screening the subdivided solid, the required fraction is added to the material retained by the initial screening and the mixture is freeze-dried.

The invention also provides apparatus for carrying out the above process which comprises at least one compression chamber, means for refrigerating the chamber to a temperature not exceeding −20° C., means for feeding frozen material under pressure to the chamber, a screw arranged to rotate in the compression chamber to compress the frozen material and a nozzle at the end of the chamber.

The single figure of the accompanying driving shows, schematically and by way of example only, one embodiment of this apparatus.

As shown in the drawing, the extrusion device according to the invention comprises a hopper 1 integral with a vertical cylinder 2 cut out at 2a such that the product passed through the hopper passes directly into the flights of the screw 3 which rotates in said chamber 2. Constant flow of the product to the screw 3 is improved by the action of an electric vibrator 4 which transmits to the wall of the hopper 1 impulses of a convenient frequency.

The cylinder 3 leads to a horizontal cylinder or compression chamber 5. The extrusion screw 6, of constant or decreasing pitch, turns inside cylinder 5 which is continuously fed under pressure by screw 3. The screw 6 tends to compress the product towards the open end of cylinder 5, which leads to a nozzle 7, preferably made of a durable synthetic resin such as Teflon. The internal wall of the nozzle comprises a frustoconical part, of which the narrow end is forward and a cylindrical portion extending from the apex of the frustoconical part. This portion defines, with the end of the screw 6, an annular aperture which gives to the extruded product the form of a continuous solid tube (shown by dot-dash lines in the drawing).

According to the invention, the apparatus is adapted to treat a product held at a low temperature and which must remain frozen practically solid until the end of the operation. Preferably, the apparatus is placed in a refrigerated chamber and is designed to operate at a temperature of −40° C. for example.

In order to facilitate the slip of the compressed product inside the compression chamber, the apparatus comprises heating means for warming some or all of the contact surfaces. A slight, superficial melting of the solid frozen material is obtained which produces a lubricating effect.

In the embodiment shown in the drawing, electric heating elements 8 are fixed at the end of cylinder 5. Another heating element 9, also electric, is mounted inside the shaft of the screw 6. Finally, an electric heating tape 10 may be wound around the nozzle 7 if the material of the latter does not have sufficient slip properties.

The method of the invention essentially comprises a series of operations which take place after the aqueous extraction of a vegetable material, such as coffee, for example. The aqueous extract is generally concentrated, whereafter the concentrated liquid may be combined with volatile aromatics obtained previously.

The concentrated liquid is then frozen to a solid on a refrigerated belt or on a tray at a temperature from $-25°$ to $-60°$ C.

Coffee extracts having a concentration lower than 28 to 30% solid material may be frozen directly and the apparent density of the dry extract will be between the conventional industrial limits, that is between 0.2 and 0.3. However the aqueous solution may advantageously be further concentrated, for example to 45 to 48% solids content, and a suitable volume of inert gas injected into the solution to produce a homogeneous foam which has the desired apparent density after freezing, grinding and drying.

The frozen extract is then ground to obtain particles having a grain size comprised, for example, between 0.3 and 2.0 mm. The fraction retained on a 0.3 mm. screen is dried, whereas the fraction passing through this screen, which is considered undesirable, is removed and stored at a low temperature.

According to the invention, one part of the frozen and ground solution, generally comprising the fine particles, is compressed at a temperature sufficiently low to avoid significant melting of the product. A frozen homogeneous solid is thus obtained in which the strength of cohesion between the initial particles is at least equal to the strengh of cohesion between the elements which constitute these particles.

The simplest method of carrying out this operation consists of compressing the frozen particles in a tablet press. The temperature in the press is adjusted so as to avoid melting of the product, that is to say to about $-25°$ C., and the pressure must be sufficient to obtain a homogeneous frozen solid.

The large proportion of fine particles produced by the grinding of the frozen extract justifies, however, the use of a continuous method of compressing these particles. This may be done using the apparatus shown in the drawing. The apparatus is placed in a cold room where it is maintained at a temperaure preferably lower than $-40°$ C. The pressure in the compression chamber should be sufficient to provide a solid coherent mass from the initial particles. The frozen product is fed by the screw 3 into said chamber under pressure and slip of the product along the surface of contact between the formed solid and the apparatus is facilitated by causing, by heating all or part of said surface, a slight melting at the surface of the solid. A tube of frozen extract is obtained which constitutes a homogeneous solid having substantially the same appearance and a density approximately the same as that of the product during initial freezing. After compression, the resulting solid is broken, ground sieved. As before, the fine particles are separated by screening and the fraction retained is dried by sublimation.

Preferably, the fraction retained from the above screening is added to the frozen extract retained during the first screening, that is the product fraction which was not subjected to compression. The two sorts of particles are carefully mixed before drying in a conventional freeze-drying installation, operating continuously or batchwise.

The following examples illustrate the invention, which, however, is not limited to the conditions disclosed.

EXAMPLE 1

An aqueous coffee extract containing 28% soluble solids is frozen to $-45°$ C. in 60 minutes. The frozen product is then broken and ground, after which the ground extract is screened on two sieves of 0.3 and 1.8 mm. aperture respectively. The fraction retained by the 1.8 mm. sieve is returned to the grinder, the product passing this sieve and retained by that of 0.3 mm. is freeze-dried and the particles smaller than 0.3 mm. are collected. This fraction represents about 25% by weight of the total subdivided product.

The fine particles are compressed in the frozen state, in a tablet press. The pressure in the press is 200 kg./cm.$^2$ and the temperature of the product is held at $-30°$ C. After compression, a homogeneous frozen solid is obtained having the form of a disc or tablet 20 cm. in diameter and 15 mm. thickness.

The discs obtained are broken up, ground and, after sieving the ground product, the fraction retained by the 0.3 mm. sieve is freeze-dried. The dry extract particles from the first and second sieves are thoroughly mixed and a dried coffee extract having a specific gravity of from 200 to 300 g. per litre is obtained.

EXAMPLE 2

A coffee extract containing 45% soluble solids is frozen to about $-3°$ C. and carbon dioxide is blown into the extract until homogeneous foam is obtained. This foam is frozen in about 10 minutes on a refrigerated metal belt to obtain a solid product having a temperature of $-45°$ C.

The frozen extract is broken up, ground and sieved as described in Example 1, except that the fraction retained by the 0.3 mm. sieve is not dried immediately and that the fraction of fine particles represents about 28% of the total ground product.

An extrusion apparatus is fed with the fine particle fraction, which is compressed continuously. The temperature inside the compression chamber is maintained at about $-30°$ C. and the extrusion head produces a ribbon of frozen extract of 10 mm. thickness and a width of about 10 cm. The ribbon is a homogeneous solid, and has substantially the same appearance as the initial frozen extract. However, its density is slightly higher.

After breaking and grinding, the subdivided extract which results from the compression of the fine particles is sieved. The fraction retained by the 0.3 mm. sieve is added to that retained during the first sieving and the mixture is dried by sublimation.

A freeze-dried coffee extract is obtained having the appearance of roast and ground coffee, practically free from fine particles and having a specific gravity between 200 and 240 g. per litre.

EXAMPLE 3

A coffee extract containing 27 to 28% by weight of soluble solids is continuously frozen on a metal belt. The temperature is maintained at about $-45°$ C. and a solid cake of frozen extract is obtained at the end of the belt.

The cake is broken up inside a cold room maintained at $-45°$ C., ground and screened on 12 and 70 mesh U.S. Standard screens. The fraction retained by the 12 mesh screen is returned to the grinder and the fraction passing through the 70 mesh screen (0.210 mm.), which is the fine particle fraction, is removed. The rest of the product is stored at a low temperature.

The extrusion apparatus is inside the cold room, and frozen fine particles are continuously fed into hopper 1. The product is transported by the screw 3 into the compression chamber 5 where it is compressed by the screw 6, turning at 160 revs./min. A part of the wall of the compression chamber and the screw 6 are heated in order to facilitate flow of the compressed material over the contact surfaces of these components. A solid tube of 50 mm. outside diameter and 6.3 mm. wall thickness issues from the nozzle 7 at a rate of 2.4 metres per minute.

The tube may be slightly plastic as it leaves the nozzle. Preferably, it immediately enters a freezing tunnel and, after a residence time of about 3 minutes, the solid tube is perfectly rigid. The tube of frozen extract is passed through a grinder and the subdivided product is screened as described above. The fraction retained by the 70 mesh screen is added to the product retained during the first screening and is freeze-dried. The fine particles passing through the 70 mesh screen are recycled.

A freeze-dried coffee extract is obtained, which is aromatised by contact before packaging under an inert atmosphere. The product resembles roast and ground coffee; it has a good colour and its specific gravity is between 200 and 280 g. per litre.

We claim:

1. A process for preparing dry tea and coffee extracts, comprising solidifying an aqueous tea or coffee extract by freezing, grinding the frozen extract and separating the ground extract into a coarse fraction and a fine fraction, compressing said fine fraction at a temperature sufficiently low to avoid significant melting of said fraction, thereby to provide a homogeneous compressed solid, subdividing said compressed solid, separating a coarse and a fine fraction from said subdivided compressed solid, and freeze-drying both the coarse fraction of said subdivided compressed solid and the first-mentioned coarse fraction.

2. A process according to claim 1 in which the first-mentioned coarse fraction and the coarse fraction of said subdivided compressed solid are mixed together before freeze-drying said fractions.

3. A process according to claim 1 in which the compressed solid is subdivided by grinding.

4. A process according to claim 1 in which the aqueous extract contains 20 to 30% by weight of soluble solids.

5. A process according to claim 1 in which the aqueous extract contains more than 30% by weight of soluble solids and is converted into a foam before freezing.

6. A process according to claim 1 in which the first-mentioned fine fraction consists of particles which pass a screen of from 0.2 to 0.4 mm. aperture.

7. A process according to claim 1 in which compression of the first-mentioned fine fraction is carried out at a temperature not exceeding −25° C.

8. A process according to claim 1 in which the first-mentioned fine fraction is compressed by extrusion.

9. A process for preparing dry tea and coffee extracts, comprising solidifying an aqueous tea or coffee extract by freezing, grinding the frozen extract and separating a coarse fraction and a fine fraction therefrom, compressing said fine fraction by continuous extrusion thereof at a temperature below −25° C. to avoid significant melting of said fraction, thereby to provide a homogeneous solid, subdividing said compressed solid, separating a coarse and a fine fraction from said subdivided compressed solid, and freeze-drying both the coarse fraction of said subdivided solid and the first-mentioned coarse fraction.

10. A process according to claim 9 in which the first-mentioned fine fraction consists of particles which pass a screen of from 0.2 to 0.4 mm. aperture.

11. A process according to claim 9 in which the compressed fine fraction is extruded in the form of a tube.

12. A process according to claim 9 in which a surface portion only of the solid is heated during extrusion thereof to facilitate the movement of the solid through the apparatus in which it is compressed.

13. A process for preparing dry tea and coffee extracts, comprising solidifying an aqueous tea or coffee extract by freezing, grinding the frozen extract and separating the ground extract into a coarse fraction and a fine-fraction, freeze-drying said coarse fraction, compressing said fine fraction at a temperature sufficiently low to avoid significant melting of said fraction, thereby to provide a homogeneous compressed solid, subdividing said compressed solid, separating a coarse and a fine fraction from said subdivided compressed solid, and freeze-drying the coarse fraction of said subdivided compressed solid.

References Cited

UNITED STATES PATENTS

| | | | |
|---|---|---|---|
| 3,438,784 | 4/1969 | Clinton et al. | 99—71 |
| 3,445,247 | 5/1969 | Baerwald | 99—71X |
| 3,447,962 | 6/1969 | Megowen | 241—3X |
| 3,463,642 | 8/1969 | Sigman | 99—199X |

FRANK W. LUTTER, Primary Examiner

WILLIAM L. MENTLIK, Assistant Examiner

U.S. Cl. X.R.

99—75, 77